United States Patent
Van Den Enden (10) Patent No.: US 6,359,848 B1
(45) Date of Patent: Mar. 19, 2002

(54) OPTICAL RECORD CARRIER AND SCANNING DEVICE

(75) Inventor: Gijsbert J. Van Den Enden, Eindhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/154,372

(22) Filed: Sep. 16, 1998

(30) Foreign Application Priority Data

Dec. 29, 1997 (EP) ............................................. 97204132

(51) Int. Cl.⁷ ................................................ G11B 7/00
(52) U.S. Cl. ................................ 369/53.29; 369/59.21; 369/124.05; 369/275.3; 369/275.4
(58) Field of Search ......................... 369/275.3, 275.4, 369/44.26, 44.34, 54, 47, 48, 59.21, 47.35, 124.05, 124.15, 53.29, 53.39, 53.4

(56) References Cited

U.S. PATENT DOCUMENTS 6,069,870 A * 5/2000 Maeda et al. ............ 369/275.4

FOREIGN PATENT DOCUMENTS

JP 06338066 A 12/1994

* cited by examiner

Primary Examiner—Thang V. Tran
(74) Attorney, Agent, or Firm—Laurie E. Gathman (57) ABSTRACT

An optical record carrier (10) comprises a recording layer for recording information in a pattern of optically detectable marks in substantially parallel tracks (11–15). Neighboring tracks are separated by edges (16–20). Control information is encoded in a modulation of the transverse position of the even-numbered edges (16, 18, 20). The modulation of neighboring even-numbered edges have a mutual fixed phase shift. The modulation of the odd-numbered edges (17, 19) is such as to enhance the amplitude of a push-pull signal when scanning the tracks (11, 12) neighboring such an odd-numbered edge (17).

10 Claims, 6 Drawing Sheets

OPTICAL RECORD CARRIER AND SCANNING DEVICE

FIELD OF THE INVENTION

The invention relates to an optical record carrier comprising a recording layer having substantially parallel tracks for recording user information in a pattern of optically detectable marks, neighbouring tracks being separated by an edge, subsequent edges having subsequent ordinal numbers, each edge having a edge, subsequent edges having subsequent ordinal numbers, each having a transverse position with a varying deviation from an average transverse position, the deviation of even-numbered edges having alternately a first and a second periodic modulation representing track-dependent control information.

The invention also relates to a method of scanning such a record carrier and an apparatus for scanning it.

BACKGROUND OF THE INVENTION

In general, a track is a line on the record carrier to be followed by a scanning device and having a length of the order of a characteristic dimension of the record carrier. A track on a rectangular record carrier has a length smaller than the length or width of the record carrier. A track on a disc-shaped record carrier is a 360° turn of a continuous spiral line or a circular line on the disc. The tracks are separated by edges. An edge is a change in the value of an optically detectable parameter when going from one track to a neighbouring track. For example, the reflectivity of the recording layer may change between tracks. The edge may be a groove or ridge of a relatively small width in between neighbouring tracks. When neighbouring tracks are at different heights with respect to the plane of the recording layer, i.e. the tracks are located on lands and grooves, the edges are formed by the groove walls between the tracks. When the tracks are parts of a spiral the tracks on land and the tracks in groove may each form one continuous spiral over the recordable area of the record carrier.

When writing user information on a record carrier by means of a scanning radiation spot, it is in general desirable to know the position of the radiation spot along a track on the record carrier. Since for this purpose user information is not available on a virgin recordable record carrier, the position information may be retrieved from the edges if the position information is encoded in a modulation of the transverse position of the edges of the record carrier. In general, the edges may represent control information in which the position information is comprised.

A record carrier having information stored in the transverse position of the edges is known from the Japanese patent application no. 06338066. The record carrier described therein comprises alternating first and second grooves in a substrate. User information may be recorded both in the grooves and on the lands between the grooves. Both edges of a groove are modulated by a transverse wobble of the centre line of the groove. The first grooves are frequency modulated at a relatively low frequency, the second grooves are frequency modulated at a relatively high frequency. When scanning a track located in a groove, the scanning spot is modulated only by the modulation of the groove, and the scanning device can read information encoded in the modulation by choosing a low-frequency decoder for a first groove and a high-frequency decoder for a second groove. When scanning a track on the land portion in between two grooves, the spot is modulated by the modulation of the edges of both neighbouring grooves. The scanning device can then discriminate between signals from the first and second groove by switching between the low- and high-frequency decoder to read the position information of the neighbouring first and second groove.

To achieve an accurate positioning of the scanning spot on the record carrier, the density of the control information in the grooves should be made as high as possible. However, the density is limited by crosstalk of the groove modulation on the signal representing the user information. In the known record carrier the frequency of the modulation of the second groove may be chosen near the limit imposed by the crosstalk. The frequency of the modulation of the first grooves must be substantially lower than the frequency of the second grooves to be able to separate the two frequencies in the scanning device and thereby create a low crosstalk between both frequencies. The substantially lower frequency results in a lower information density. Hence, the first grooves have a relatively low position information density.

SUMMARY OF THE INVENTION

It is an object of the invention to provide a record carrier and scanning method having a high control information density.

In accordance with an aspect of the invention, the record carrier as described in the opening paragraph is characterized in that the first and second periodic modulations have a predetermined phase relation and in that the deviation of an odd-numbered edge is in the same direction as the deviation of one of its neighbouring edges at the position along the track where the deviation of its other neighbouring edge is substantially equal to a predetermined value.

Whereas in the prior art both edges of a groove are modulated identically, the edges of a track in the record carrier according to the invention are modulated differently. A track according to the invention is, in the transverse direction, bound by an even-numbered edge and an odd-numbered edge. The transverse position of the even-numbered edge is encoded with control information. When scanning the track by means of a scanning spot, the control information is retrieved by sampling the transverse positions of both edges at regular positions along the track. The sample positions are determined with respect to the previous or next even-numbered edge which neighbours the odd-numbered edge of the track being scanned. The sampling positions correspond to the positions along the track where the deviation of the previous or next even-numbered edge is substantially equal to a predetermined value. At these positions, the odd-numbered edge has a transverse deviation in the same direction as the deviation of the even-numbered edge of the track. The equal direction of the deviations of both edges of the track enhance the signal derived from the edge positions, thereby improving the quality of the reading of the control information. The sample positions for neighbouring tracks are shifted in the longitudinal direction, because of the phase shift between the modulations of the transverse edge positions of the even-numbered edges. Therefore, the odd-numbered edge located between two even-numbered edges can have a deviation in the appropriate direction for the sample positions of both tracks it separates. The specific variation of the transverse position of the edges allows a high control information density, independent of the track. Moreover, the strength of a read signal obtained from the deviations may be made equal for all tracks of the record carrier.

To simplify the detection of the transverse positions, the predetermined value of the deviation is preferably equal to zero, i.e. the deviation of the edge is equal to the average deviation of the edge.

An odd-numbered edge has preferably a modulation which is proportional to the sum of the modulations of both neighbouring even-numbered edges.

The modulation of the edge position must have a high information density for accurate position information on the one hand and not too high a frequency content to avoid cross talk on the other hand. A sinusoidal modulation of the edge is a preferred compromise between these two requirements.

The phase shift between the modulations of neighbouring even-numbered edges is preferably substantially equal to 90°. As a consequence, if the modulation of one of the edges is a sine wave, the modulation of the other edge is a cosine wave. When a sample is taken during the scanning of a track at a first position of 90°, the deviation of the cosine modulated edge will be zero, and the detector signal directly indicates the value of the sine-modulated edge. When, likewise, a sample is taken at a second position of 0°, the deviation of the sine-modulated edge will be zero and the detector signal will indicate the deviation of the modulation of the cosine-modulated edge. As a result, the cross-talk between even-numbered edges is reduced.

In a preferred embodiment of the record carrier the control information is encoded in the edge positions by 180° phase-shift keying. Since this type of encoding does not affect the positions where the edge deviation has a zero value, it can be combined suitably with the phase-shifted modulations of the invention.

Neighbouring tracks are preferably arranged at different heights with respect to the plane of the recording layer and the edges are walls between neighbouring tracks. The subsequent tracks will form a land-groove structure in which a track in a groove adjoins a track on land. One wall of a groove, the even-numbered edge, is position-modulated with control information. The other wall of the groove is modulated such that, at the sample positions, it enhances the read signal derived from the modulation of the even-numbered edge when scanning the groove. When scanning a land, one edge is similarly encoded with control information and the other edge enhances the signal of the first edge.

A proper definition of the positions along a track for taking samples can be obtained when the edge deviations are provided with clock marks. In that case the sampling positions can be defined with respect to the clock marks.

The modulation may contain parts representing position information, such as address information, and parts not representing position information, such as clock marks. The clock marks may have fast rising and falling edges, used in the detection of the clock marks. The clock marks in adjacent edges are preferably aligned in a direction transverse to the tracks. To reduce interference with the reading of user information, adjacent clock marks have preferably the same phase.

In order to prevent that an edge modulation representing control information is detected as a clock mark, the modulation representing control information has preferably a finite derivative with respect to the position along the track. When the track modulation is sinusoidal, this can be realized by using parts of a sine wave beginning or ending at 0° or 180° and parts of a cosine wave beginning or ending at 90° or 270°. If necessary, the modulation pattern may be completed to have a predetermined, fixed length by adding track parts having no variation at the beginning or end of a sinusoidal variation.

In a accordance with a further aspect of the invention, a method of scanning a record carrier is provided as described in the claims.

In accordance with a still further aspect of the invention, an apparatus is provided for scanning an optical record carrier according to the invention as described in the claims.

BRIEF DESCRIPTION OF THE DRAWINGS

The objects, advantages and features of the invention will be apparent from the following more particular description of preferred embodiments of the invention, as illustrated in the accompanying drawings, in which.

DETAILED DESCRIPTION OF THE INVENTION

Figure 1A:
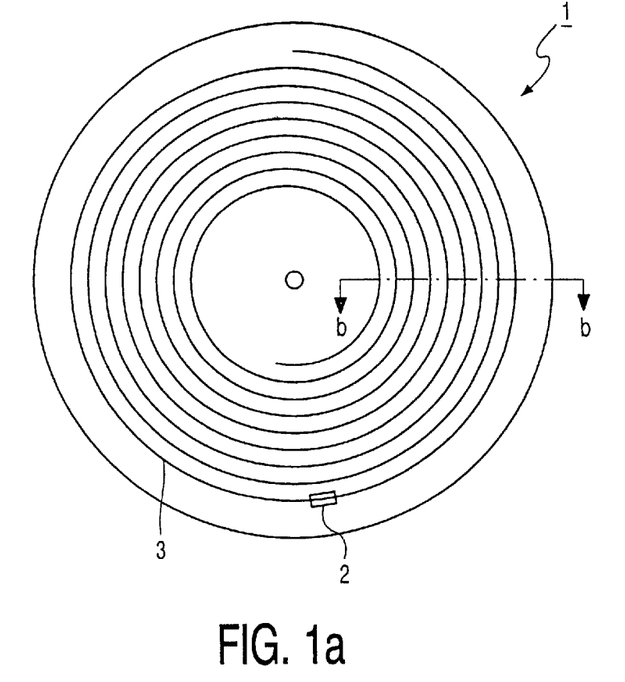
FIGS. 1a through 1e show embodiments of the record carrier in accordance with the invention.
Figure 1B:
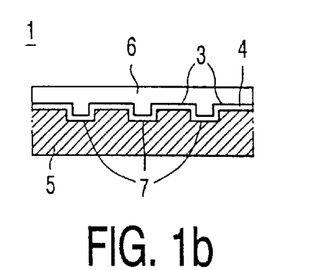
Figure 1C:
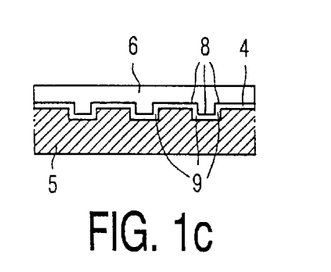
Figure 1D:
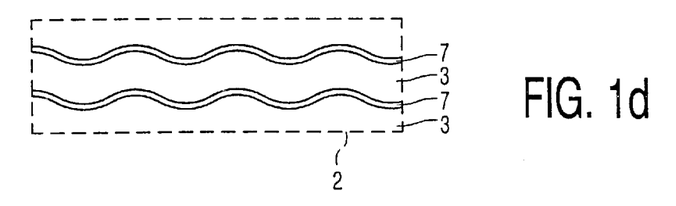
Figure 1E:
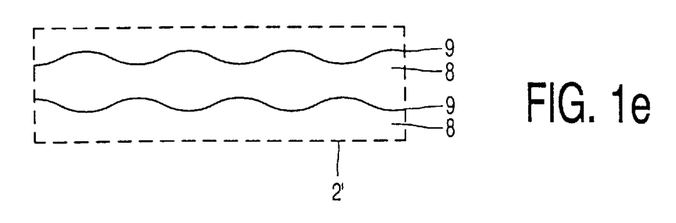

FIG. 1 shows embodiments of a record carrier 1 according to the invention, FIG. 1a being a plan view, FIGS. 1b and 1c showing a small part in a sectional view taken on the line b—b, and FIG. 1d and FIG. 1e being plan views showing a portion 2 and 2' of a first and second embodiment, respectively, of the record carrier 1 to a highly enlarged scale. The record carrier comprises a series of tracks 3, each forming a 360° turn of a spiral line, of which some eight are shown in the Figure. The tracks are constituted, for example, by preformed grooves or ridges. For the purpose of recording user information the record carrier 1 comprises a recording layer 4, which is deposited on a substrate 5 and which is covered by a protective coating 6. The record carrier may be irradiated from the side of substrate 5, which, in that case, must be transparent, or from the side of protective coating 6. The recording layer may be made of a radiation-sensitive material which, if exposed to suitable radiation, is subjected to an optically detectable change. Such a layer may be, for example, a thin layer of material such as tellurium, which changes reflection upon heating by a radiation beam. Alternatively, the layer may consist of magneto-optic or phase-change materials, which change direction of magnetization or crystalline structure, respectively, upon heating. When the tracks are scanned by a radiation beam with a relatively high intensity and the intensity is modulated in conformity with the information to be recorded, an information pattern of optically detectable marks is obtained, which pattern is representative of the information. In a non-recordable, read-only record carrier layer 6 may be a reflective layer, for example made from a metal such as aluminum or silver. The information in such a record carrier is prerecorded in the record carrier during its manufacture, for example in the form of embossed pits.

The substantially parallel tracks are separated by edges. In the sectional view of FIG. 1b the tracks 3 are separated by edges in the form of grooves 7. The grooves may also be ridges. FIG. 1c shows a sectional view of another embodiment of the record carrier, in which neighbouring tracks 8 are arranged at different heights with respect to the plane of the recording layer, i.e. neighbouring tracks are located in a groove and on a land. Walls 9 of the grooves form the edges between the tracks. FIGS. 1*d* and 1*e* show a plan view of the embodiments of FIGS. 1*b* and 1*c*, respectively. Each Figure shows two neighbouring tracks 38 and two neighbouring edges 7, 9.

In order to determine the position of the track portion being scanned relative to the beginning of a reference track, position information is recorded by means of a preformed modulation of the transverse position of the edges, suitably in the form of a sinusoidal wobble, for example as shown in FIG. 1*d* in which the radial position of the centre of grooves 7 is wobbled and in FIG. 1*e* in which the radial position of walls 9 is wobbled.

It is to be noted that in FIGS. 1*d* and 1*e* the modulation of the edges has been exaggerated strongly. In reality, a wobble having an amplitude of approximately $20 \cdot 10^{-9}$ meter in the case of a track width of $600 \cdot 10^{-9}$ m has been found to be adequate for a reliable detection of the radiation-beam modulation. A small amplitude of the wobble has the advantage that the width of the tracks is not strongly affected by the edge modulation, which reduces the cross talk of the edge modulation on the read signal of the user information.

In a special embodiment of the record carrier, the edge modulation represents control information, which includes said position information. The control information is divided into servo segments of 56 binary bits. The first bit of a servo segment represents a synchronisation pattern used for synchronisation of the position information. The next three bits represent the layer number of the record carrier. The number indicates the ordinal number of the recording layer in a record carrier having a plurality of superjacent recording layers. The next four bits of the servo segment represent the segment number in a track. A track is divided into sixteen radially aligned servo segments. The next 24 bits represent the track number of the track. The two tracks on both side of an even-numbered edge have the same track number. In a land-groove record carrier, the sign of a radial tracking error signal allows a scanning device to determine whether the track being scanned is located in a groove or on a land. The inner-most track on the record carrier has track number 0. The last 24 bits of a servo segment represent three parity bytes used for error correction of the control information.

Figure 2:
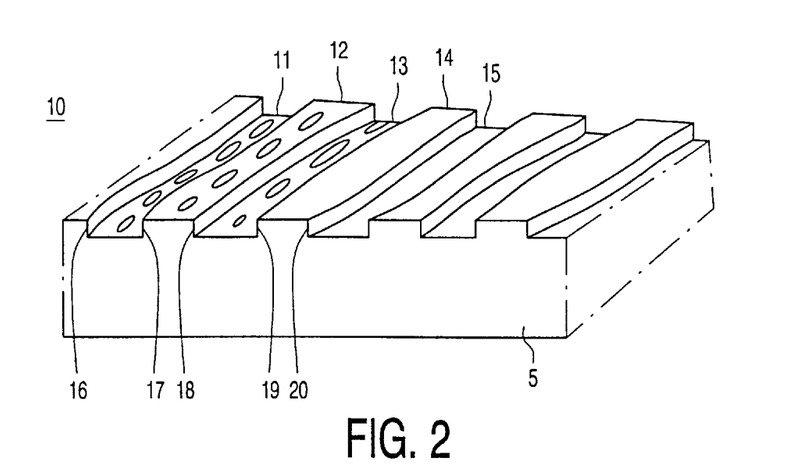
FIG. 2 shows a perspective view of a record carrier.

FIG. 2 shows a perspective view of a cross-section of a record carrier 10 having tracks located in grooves and on land portions between the grooves, as in the embodiment shown in FIGS. 1*c* and 1*e*. The record carrier has a plurality tracks and interjacent edges. Subsequent tracks in the Figure have the ordinal numbers 11–15, which need not correspond to the track numbers written in the control information pertaining to these tracks. The subsequent edges have the ordinal numbers 16–20. User information patterns of recording marks have been indicated schematically in the tracks 11, 12 and 13. The tracks have been provided with control information by modulating the position of both walls of the grooves. A scanning device suitable for scanning such a record carrier is able to guide a radiation spot both along the centre of a groove and along the centre of a land in between two grooves. The device may write, read and/or erase information in the groove and on the land. When scanning along a track, the scanning device can obtain position information from the groove wobble. The groove wobble may be read by means of a method usually called the push-pull method, known from inter alia the American patent no. U.S. Pat. No. 4,057,833. When scanning along a land, the push-pull method gives a signal the magnitude of which is the result of the groove wobbles of both adjacent grooves.

Figure 3:
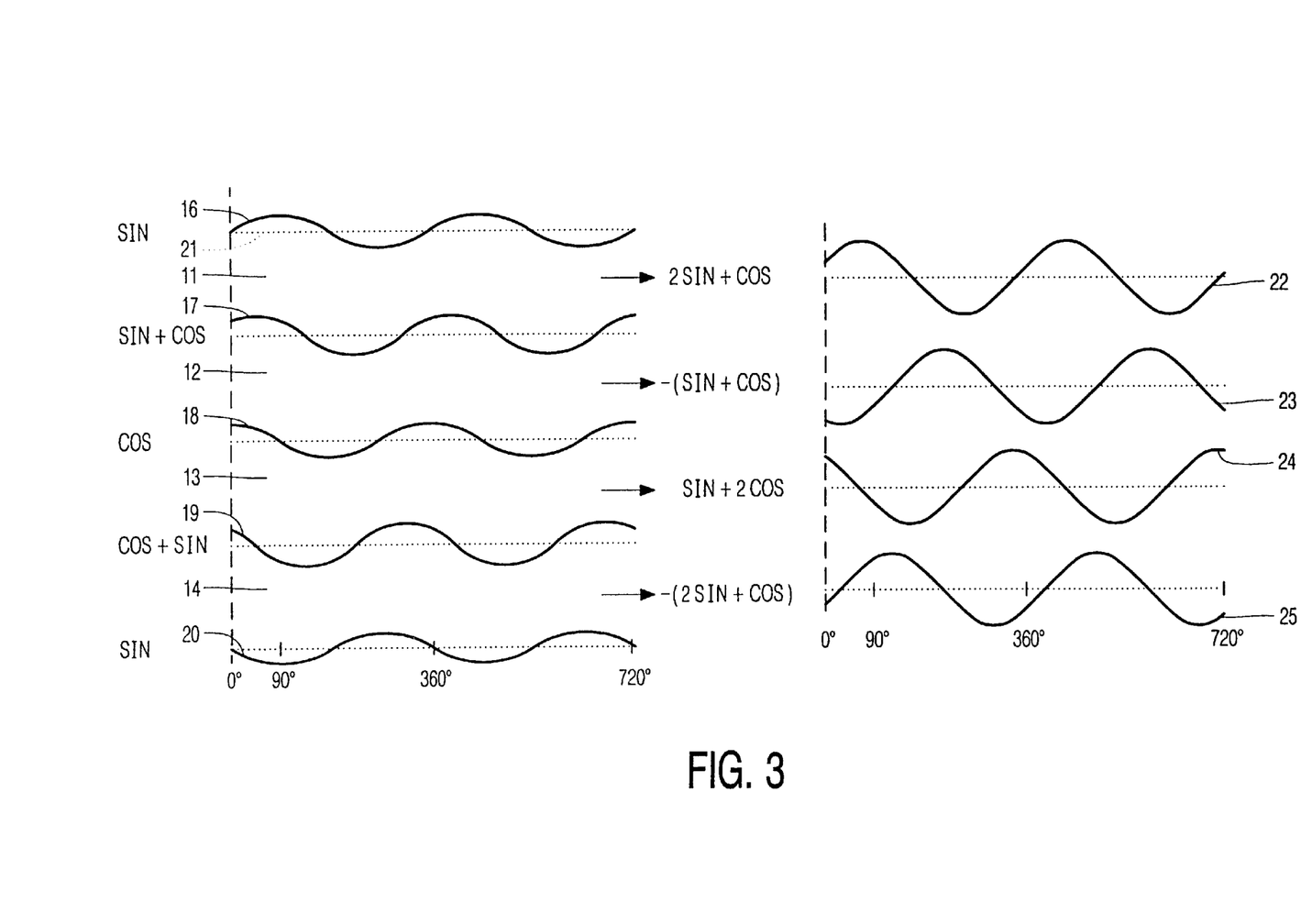
FIG. 3 shows the modulation of five adjacent edges according to the invention.

FIG. 3 shows schematically a plan view of tracks 11–14 and edges 16–20. Although the reference numerals are identical to reference numerals in FIG. 2, the principle of the embodiment shown in FIG. 3 is not limited to the land-groove embodiment shown in FIG. 2. The position along a track is indicated by degrees, where 360° is one period of the sinusoidal pattern with which the position of the edges has been modulated. The dashed lines 21 in the Figure indicate the average transverse position of each edge. The deviations of the transverse position of edges 16 and 20 from the average position have a sine modulation, encoded with control information for adjacent tracks 11 and 14 respectively, whereas edge 18 has a cosine modulation of its position transverse to the length-direction of the tracks, encoded with control information for adjacent tracks 12 and 13. The periodic modulations of edges 16 and 20 on the one hand and edge 18 on the other hand have a phase shift of 90°. Edge 17 has a modulation of its transverse position proportional to the sum the modulations of both neighbouring edges 16 and 18, i.e. proportional to the sum of a sine and a cosine modulation. Likewise, edge 19 has a modulation proportional to the sum of the modulations of edges 18 and 20. As a result, the deviation of odd-numbered edge 17 is in the same transverse direction as the deviation of its neighbouring edge 16 at the position along the track where the deviation of its other neighbouring edge 18 is substantially equal to zero. This relation applies to any triplet of an even-, odd- and even-numbered edge modulated according to the invention.

The right half of FIG. 3 shows four signals 22, 23, 24 and 25 from a push-pull detector, obtained when the spot of the scanning device follows tracks 11, 12, 13 and 14 respectively. The left and right half of the Figure indicate the same position in degrees along the track. The amplitude of the signals are proportional to the sum of the two edges of a track. When following track 11, push-pull signal 22 is a linear combination of the modulations of edges 16 and 17. Since edges 16 and 17 are modulated by a sine and (sine+cosine), respectively, signal 22 will be proportional to (2*sine+cosine), as indicated near signal 22 in the right half of the Figure. The control information in the even-numbered edges is preferably encoded by 180° phase-shift keying. In that case the deviation of edge 16 should be sampled at the 90°, 270°, etc. positions along track 11 in order to have a maximum push-pull signal amplitude. The deviation of the next even-numbered edge 18 should be sampled at 0°, 180°, etc. positions along tracks 12 and 13. The deviation of the odd-numbered edges contribute to the samples of both neighbouring even-numbered edges. For example, edge 16 has an upward deviation at the 90° position in the Figure; edge 17 also has an upward deviation at this position, thereby enhancing the amplitude of the push-pull signal of track 11 at this position. Edge 18 has a downward deviation at the 180° position in the Figure; edge 17 also has a downward deviation at his position, thereby enhancing the amplitude of the push-pull signal of track 12 at this position.

When the amplitude of the modulation in the odd-numbered edges is √2 times the amplitude of the modulation of the even-numbered edges, the push-pull signal is twice as large as compared to the situation of an odd-numbered edge having zero amplitude as known from the prior art. If the same push-pull signal amplitude is desired as in the case of a zero edge modulation of odd-numbered edges, the amplitude of the edge modulations in a record carrier according to the invention may be half the amplitude of the edge modulation of the prior art record carrier, thereby reducing the cross talk of the edge modulation on the user-information signal. The amplitude of the modulation in the odd-numbered edges may also be equal to the amplitude of the modulation of the even-numbered edges. The cross talk on the user-information signal may be reduced by replacing the extremes of the modulation of the odd-numbered edges by a level part, i.e. a part having a constant deviation. Such a level part in the edge deviation reduces the changes in width of a track neighbouring the edge and does not affect the push-pull signal if the level part does not extend over a sample position.

A scanning device may sample the push-pull signal at both the 0° and 90° positions when scanning a track and select the largest sample for deriving the encoded control information. When scanning track 11, the amplitude of the 90° sample of signal 22 is larger than that of the 0° sample, and the 90° sample must be used for deriving the control information encoded in edge 16. When scanning tracks 12 or 13, the 0° samples of signals 23 or 24 have a larger amplitude than the 90° samples, and the 0° samples must be used for deriving the control information encoded in edge 18.

FIG. 4 shows a possible way of coding information in sinusoidal edge position modulation. One bit of control information is stored in one 810° section of an edge. Consecutive bits are stored in consecutive sections. FIG. 4a shows a synchronization pattern. The unique pattern of two consecutive 0° to 180° sections of a sinewave, one 90° section having zero deviation and two consecutive 180° to 360° sections of a sinewave does not occur in parts of the tracks other than those representing a synchronization pattern.

Figure 4A:
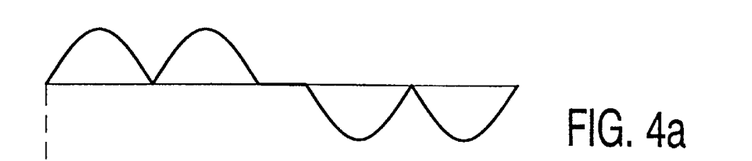
FIGS. 4a through 4e show edge modulations encoding information.
Figure 4B:
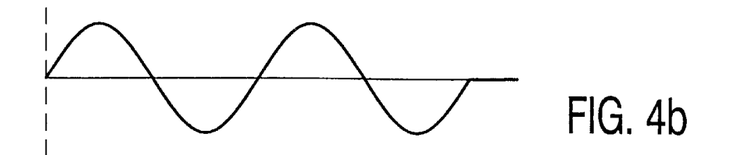
Figure 4C:
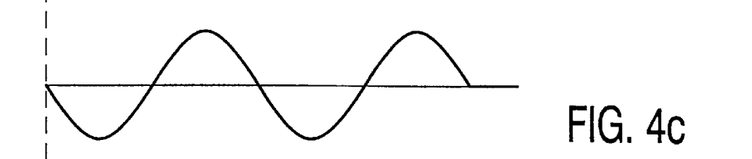
Figure 4D:
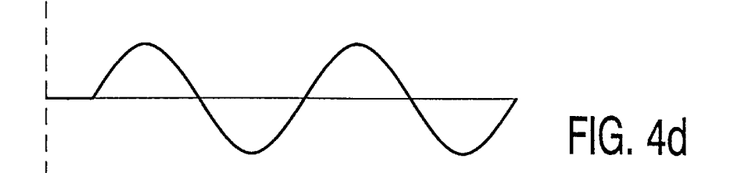
Figure 4E:
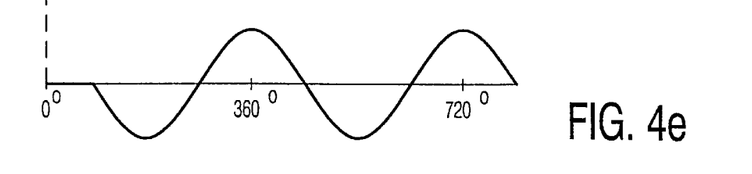

Information in even-numbered edges is encoded with alternately a first and a second periodic modulation. In FIG. 3 edges 16 and 20 are encoded with the first modulation and edge 18 with the second modulation. The way logical ones and zeros are encoded in the two modulations is shown in FIGS. 4b–4e. FIG. 4b shows the pattern representing a logical one according to the first modulation. The pattern comprises two complete sinewaves followed by one 90° section having zero track deviation. FIG. 4c shows the pattern representing a logical zero according to the first modulation. The pattern comprises two complete inverted sinewaves followed by one 90° section having zero track deviation. FIG. 4d shows the pattern representing a logical one according to the second modulation. The pattern comprises one 90° section having zero track deviation followed by two complete sinewaves. FIG. 4e shows the pattern representing a logical zero according to the second modulation. The pattern comprises one 90° section having zero track deviation followed by two complete inverted sinewaves. The sinusoidal patterns always start and end on a zero value and not on a maximum or minimum value, in order to avoid sharp transitions in the modulation pattern. Such transitions could otherwise be interpreted as clock marks embedded in the modulation pattern.

Figure 5:
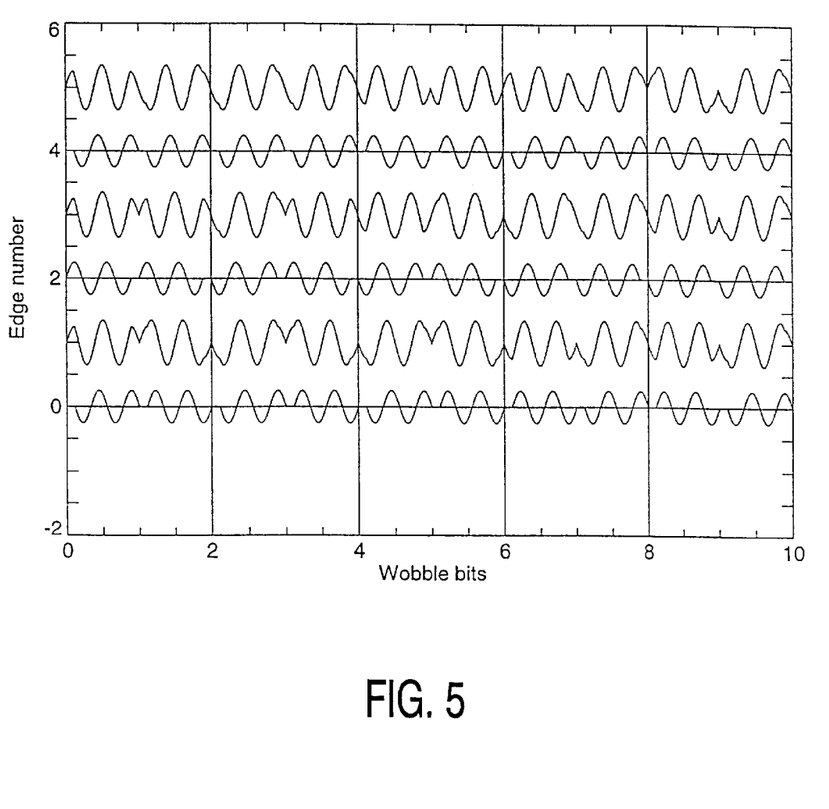
FIG. 5 shows the modulation of six adjacent edges according to the modulation of FIG. 4.

FIG. 5 shows the modulation of the transverse position of six subsequent edges encoded according to the modulations as shown in FIG. 4. Edge 2 is encoded according to the first modulation and edges 0 and 4 are encoded according to the second modulation. The horizontal axis shows the encoded bits. The modulation of the odd-numbered edges is proportional to the sum of the modulations of the two neighbouring edges.

The invention is not limited to the modulation patterns shown in FIG. 4. The patterns may comprise only one instead of two complete sinewaves. The average value of each pattern or of a series of patterns is preferably zero in order to avoid offsets in the tracking. Instead of the sinusoidal modulation pattern, other patterns may be used, such as a triangular pattern or sinc-function pattern.

Figure 6:
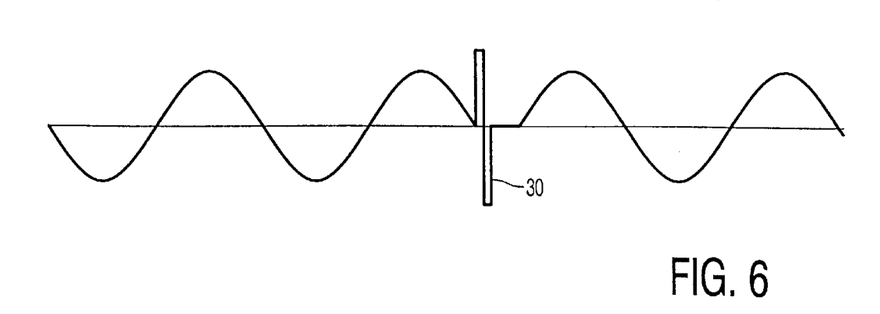
FIG. 6 shows a track modulation with clock mark.

FIG. 6 shows an example of a clock mark 30 embedded in a modulation pattern of a logical zero and one. The clock marks is a relatively fast modulation of the edge from zero deviation to a maximum upward deviation, next to a maximum downward deviation and back to a zero deviation. The relatively fast modulation of the clock marks allows extraction of the clock marks from the detector signal by frequency selection. The clock marks are preferably arranged at 0° positions along the track. A satisfactory clock extraction has been achieved when there are 128 clock marks on one track, i.e. on one revolution of a disc-shaped record carrier.

Figure 7:
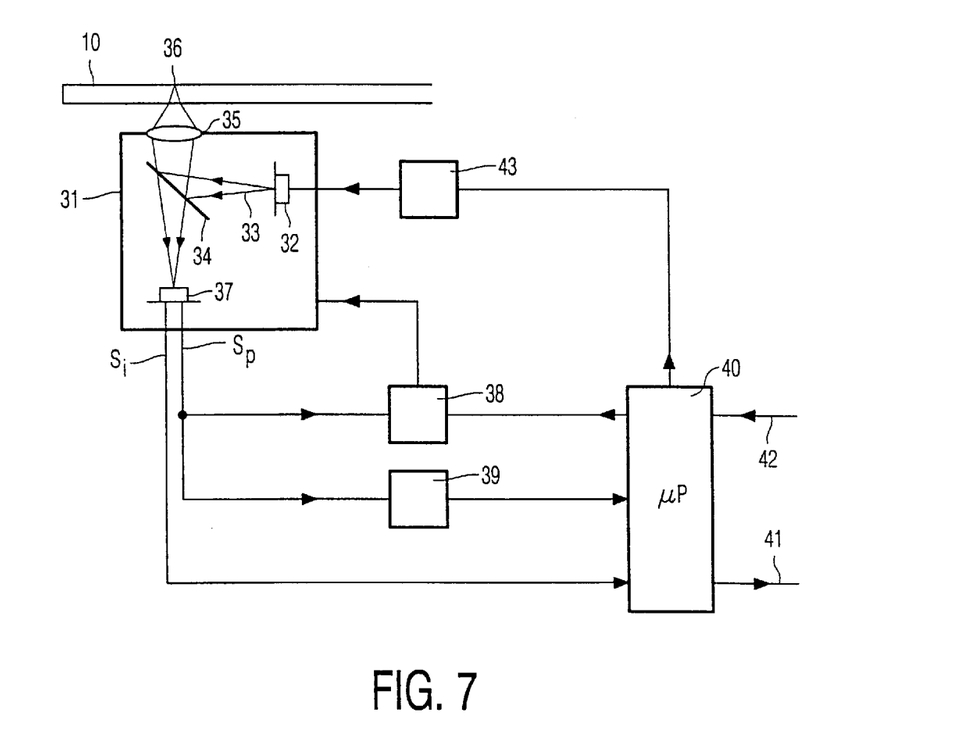
FIG. 7 shows a scanning device according to the invention.

FIG. 7 shows an apparatus for scanning a record carrier as shown in FIG. 2. The apparatus comprises an optical system 31 for optically scanning tracks in record carrier 10. Optical system 31 comprises a radiation source 32, for example a semiconductor laser. Radiation source 32 emits a radiation beam 33, which is reflected by a beam splitter 34 and converged by an objective lens 35 to a radiation spot 36 on the tracks in an information layer of record carrier 10. Radiation reflected from the record carrier is guided to a detector through objective lens 35 and beam splitter 34 to a detector 37. The detector is a split-detector having a dividing line between the two halves of the detector running parallel to the longitudinal direction of the tracks being scanned. The sum signal of the two halves, usually called the central aperture signal, represents the information recorded in the tracks and is output as signal $S_i$. The difference signal of the two halves, usually called the push-pull signal, represents control information and servo information recorded in the tracks, and is output as signal $S_p$. The low-frequency content of the signal $S_p$ represents the servo information, indicating the position of the radiation spot 36 with respect to the centre-line of the track being scanned; the low-frequency signal is also called the radial tracking error signal. The signal $S_p$ is used as input for a servo circuit 38, possibly after a low-pass filter which passes the servo information but blocks the position information. The servo circuit controls the position of the radiation spot in a direction perpendicular to the direction of the track by controlling the position of optical system 31 and/or the position of objective lens 35 within the optical system.

The signal $S_p$ is also fed into a signal processor 39, which extracts the control information from the signal $S_p$. The control-information signal output from signal processor 39 is fed into a micro-processor 40, as shown in FIG. 7. The micro-processor can derive, for example, the current position of radiation spot 36 on record carrier 10 from the position-information contained in the control information signal. During reading, erasing or writing, the micro-processor can compare the current position with a desired position and determine the parameters for a jump of the optical system to the required position. The parameters for the jump are fed into servo circuit 38. The information signal $S_i$ is fed into the micro-processor, enabling it to derive for instance directory information from the signal, which may he used for controlling the position of the radiation spot. The information signal is provided as output signal 41 of micro-processor 40.

When writing user information on a record carrier having tracks prerecorded with position information in the edges, the user information to be recorded is fed into micro-processor 40 as a signal 42. The scanning device reads the position information from the edge positions. Micro-processor 40 synchronizes the information to be written with the position information and generates a control signal which is connected to a source control unit 43. Source control unit 43 controls the optical power of the radiation beam emitted by radiation source 32, thereby controlling the formation of marks in recording layer 4 of the record carrier. The synchronisation may involve the imposition of a fixed relation between the synchronisation patterns in the position information and synchronisation patterns present in the user information signal to be recorded.

Figure 8:
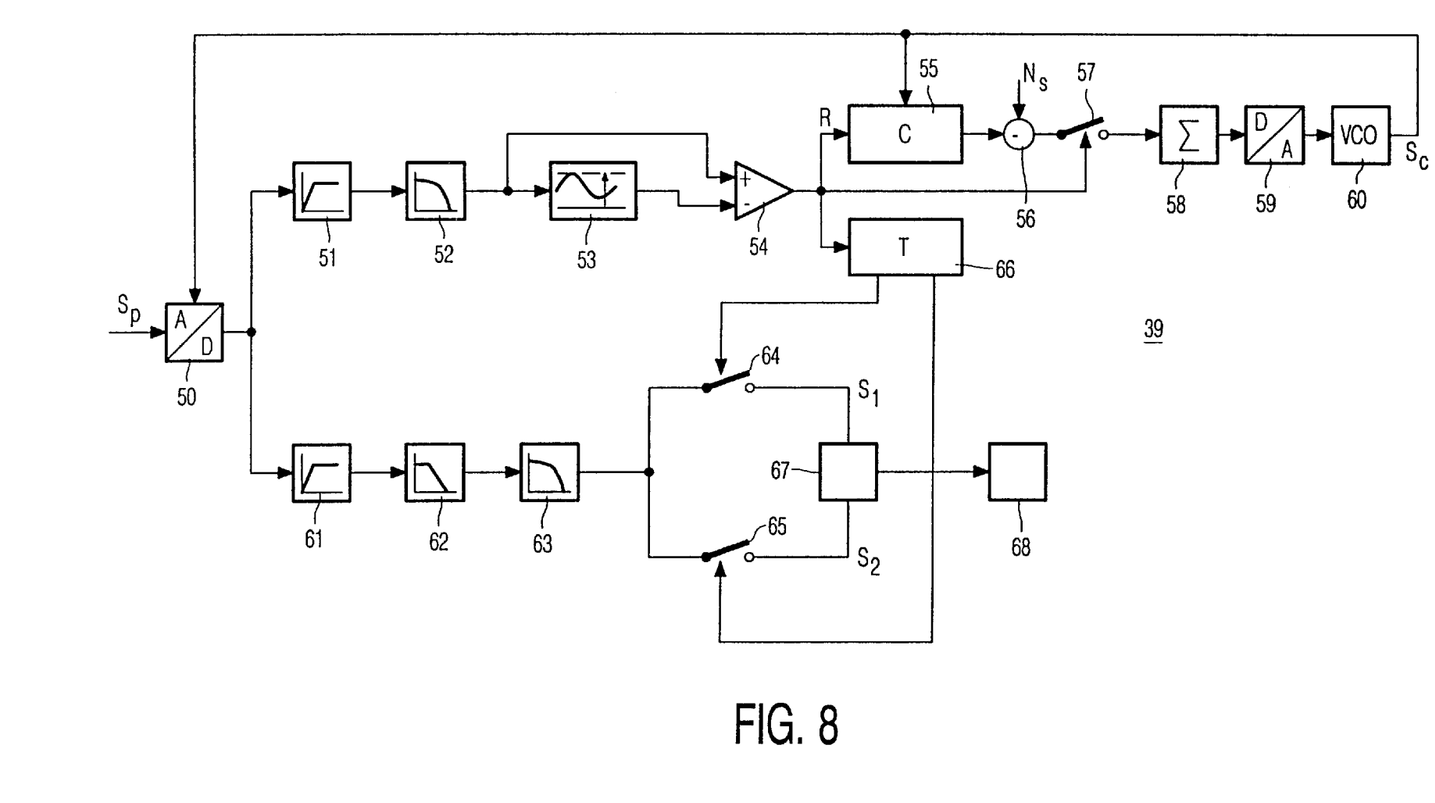
FIG. 8 shows a signal processor for deriving position information from a detector signal.

FIG. 8 shows an embodiment of signal processor 39 for extracting the position information from the push-pull signal $S_p$. The signal $S_p$ is connected to the input of an analog-to-digital convertor 50, which converts the analog signal $S_p$ into a digital output signal by taking samples at a rate determined by a clock signal $S_c$. The number of samples taken by convertor 50 is in excess of the number of samples required for retrieving the control information. This large number of samples is used for deriving the smaller number of samples required for retrieving the control information. The digital output signal is connected to a high-pass filter 51, 52, which passes only the clock marks present in the digital output signal. In the embodiment shown the filter comprises a high-pass filter 51 and a cosine filter 52. The output of the high-pass filter is fed into cosine filter 52, which is a two-tab finite response filter having a zero at half the sample frequency used in the high-pass filter. A peak detector 53 determines the peak value of the filtered clock marks. The peak detector has such a time constant that a running value of the peak values is obtained. The output of the peak detector and the filtered clock marks are both connected to a comparator 54. The comparator provides an output signal only when the signal of a clock mark exceeds half the peak value of a clock mark, thereby avoiding that the circuit is triggered by noise. The output signal of the comparator is connected to the reset input of a counter 55. The counter has a count input connected to the clock signal $S_c$ and counts the number of samples in between two clock marks. A subtracter 56 subtracts this number of samples from a reference number $N_s$, indicating the desired number of samples between two clock pulses. A specific embodiment of a disc-shaped record carrier according to the invention has 128 clock marks in a track. Each track is divided in 16 servo segments, each having 56 bits. The number of bits between two clock marks is thus equal to seven. Signal processor 39 takes 400 samples per bit, i.e. per 810° section of a track. It will thus take $N_s=2800$ samples between two subsequent clock marks. A switch 57, controlled by the output of comparator 54, passes the difference value of the subtracter to an integrator 58. The output of the integrator is converted from digital to analog by a digital-to-analog convertor 59. The analog output signal of the convertor is used as input for a voltage-controlled oscillator 60, providing clock signal $S_c$. This clock signal is used for controlling the sample rate and processing rate of all components 50 to 59. The components 50 to 60 form a closed loop which sets the number of samples between two consecutive clock marks at the predetermined value $N_s$, independent of the scanning speed of the record carrier.

The digital output signal of the analog-to-digital convertor 50 is connected to an input of a band-pass filter, which, in the embodiment of the Figure, comprises a high-pass pass filter 61, a low-pass filter 62 and a cosine filter 63. The band-pass filter passes the wobble signal representing the edge modulation and blocks the passage of the clock marks. The output of the band-pass filter is connected to two switches 64 and 65, controlled by a timing circuit 66. The timing circuit determines the points of time, or positions along a track, where the wobble signal has a value characteristic of the position information encoded in the servo tracks.

If the modulation patterns have the form shown in FIG. 4, the sample positions along a first track for the patterns of FIGS. 4b and 4c are 90°, 270°, 450° and 630°; the deviations of the patterns of FIGS. 4d and 4e at these positions are zero. The sample positions along a second track for the patterns of FIGS. 4d and 4e are 180°, 360°, 540° and 720°; the deviations of the patterns of FIGS. 4b and 4c at these positions are zero. Since the band-pass filter requires a settling time to adapt its output signal to its input signal, the positions are preferably chosen near the end of a pattern, i.e. at 450° or 630° for the first track and at 540° or 720° for the second track. If the sample position for the first track is taken to be 450°, timing circuit 66 closes switch 64 momentarily to pass that sample out of the 400 samples in each bit of the wobble signal which has an ordinal number closest to 450*400/810. Instead of choosing the closest sample, it is also possible to calculate the measured edge deviation at the required instant by interpolating between the samples. If the sample has a positive value, a logical '1' is output as control information bit of the first track; if it is negative, a logical '0' is output. Likewise, if the position for the second track is taken to be 540°, switch 65 closes momentarily to pass the sample in each bit having an ordinal number closest to 540*400/810. If the sample has a positive value, a logical '1' is output as control information bit of the second track; if it is negative, a logical '0' is output.

Two signals $S_1$ and $S_2$ with two different series of sample values are available after switches 64 and 65, respectively. A selection circuit 67 receives signals $S_1$ and $S_2$, and selects for the track currently being scanned whether the samples of $S_1$ or of $S_2$ have the largest amplitude. Selection circuit 67 will select the samples of the signal having the highest amplitude and transfer them to a decoding circuit 68. The decoding circuit transforms the stream of samples to a stream of logical bits according to the first or second modulation shown in FIG. 4, depending on whether a first or a second track is being scanned. The consecutive bits at the output of decoding circuit 68 represent control information pertaining to the track being scanned.

In an embodiment of signal processor 39 alternative to the one shown in FIG. 8, the closed loop of components 50 to 60 is entirely digital. Analog-to-digital converter 50 is replaced by an analog-to-digital converter sampling at a fixed, high rate. The samples of the convertor are fed into a down-sampler, which reduces the number of samples in accordance with a reduction factor input in the down-sampler. The output of the down-sampler is connected to the inputs of filters 51 and 61. Digital-to-analog converter 59 and voltage-controlled oscillator 60 in FIG. 7 are not needed, and the output of integrator 58 is used as reduction factor for the down-sampler.

What is claimed is:

1. An optical record carrier comprising a recording layer having substantially parallel tracks for recording user information in a pattern of optically detectable marks, neighbouring tracks being separated by an edge, subsequent edges having subsequent ordinal numbers, each edge having a transverse position with a varying deviation from an average transverse position, the deviation of even-numbered edges having alternately a first and a second periodic modulation representing track-dependent control information, characterized in that the first and second periodic modulations have a predetermined phase relation and in that the deviation of an odd-numbered edge is in the same direction as the deviation of one of its neighbouring edges at the position along the track where the deviation of its other neighbouring edge is substantially equal to a predetermined value.

2. Optical record carrier according to claim 1, wherein the predetermined value is zero.

3. Optical record carrier according to claim 1, wherein the first and second periodic modulations are sinusoidal.

4. Optical record carrier according to claim 1, wherein the predetermined phase relation is equal to a phase shift of substantially 90° and the deviation of the odd-numbered tracks have a modulation proportional to the sum of the deviations of the neighbouring edges.

5. Optical record carrier according to claim 3, wherein the control information is encoded by 180° phase-shift keying.

6. Optical record carrier according to claim 1, wherein neighbouring tracks are arranged at different heights with respect to the plane of the recording layer and the edges are walls between neighbouring tracks.

7. Optical record carrier according to claim 1, wherein the deviation of even- and/or odd-numbered edges are modulated with clock marks.

8. A method of scanning a record carrier having substantially parallel tracks for recording user information in a pattern of optically detectable marks, neighbouring tracks being separated by an edge, subsequent edges having subsequent ordinal numbers, each edge having a transverse position with a varying deviation of the transverse position from an average transverse position, and the deviation of even-numbered edges having alternately a first and a second periodic modulation representing track-dependent control information, characterized in that the first and second periodic modulations have a predetermined phase relation, and when scanning a track the control information is obtained by sampling a read signal representing the deviation of the edges of the track at regular positions along the track corresponding to the positions where the deviation of the nearest even-numbered edge not neighbouring the track being scanned are substantially equal to zero.

9. Method according to claim 8, wherein the first and second periodic variations are sinusoidal and the predetermined phase relation is equal to a phase shift of substantially 90°.

10. An apparatus for scanning a record carrier having substantially parallel tracks for recording user information in a pattern of optically detectable marks, the tracks neighbouring tracks being separated by an edge, subsequent edges having subsequent ordinal numbers, each edge having a transverse position with a varying deviation from an average transverse position, and the deviation of even-numbered edges having alternately a first and a second periodic modulation representing track-dependent control information, the apparatus comprising an optical system for scanning tracks by a radiation beam, a detector for detecting a radiation beam coming from the record carrier and modulated by the edge position, and a signal processor for deriving the control information from an output signal of the detector, characterized in that the signal processor is provided with a timer for locating positions along the track being scanned and a sampler connected to the timer for sampling the output signal of the detector, the positions corresponding to the positions where the deviation of the nearest even-numbered edge not neighbouring the track being scanned are substantially equal to zero.

* * * * *